(12) United States Patent
Wilhelm et al.

(10) Patent No.: US 11,945,299 B2
(45) Date of Patent: Apr. 2, 2024

(54) TWO-PIECE FUEL FILLER TUBE ASSEMBLY BRACKET

(71) Applicant: Fluid Routing Solutions, LLC, Madison Heights, MI (US)

(72) Inventors: Thomas K. E. Wilhelm, West Bloomfield, MI (US); Barry Lee Damron, Waterford, MI (US)

(73) Assignee: FLUID ROUTING SOLUTIONS, LLC, Madison Heights, MI (US)

( * ) Notice: Subject to any disclaimer, the term of this patent is extended or adjusted under 35 U.S.C. 154(b) by 779 days.

(21) Appl. No.: 16/979,540

(22) PCT Filed: Mar. 27, 2019

(86) PCT No.: PCT/US2019/024283
§ 371 (c)(1),
(2) Date: Sep. 10, 2020

(87) PCT Pub. No.: WO2019/191233
PCT Pub. Date: Oct. 3, 2019

(65) Prior Publication Data
US 2021/0001717 A1   Jan. 7, 2021

Related U.S. Application Data

(60) Provisional application No. 62/649,087, filed on Mar. 28, 2018.

(51) Int. Cl.
*B60K 15/04* (2006.01)
*B60K 15/01* (2006.01)
(Continued)

(52) U.S. Cl.
CPC ............. *B60K 15/04* (2013.01); *B60K 15/01* (2013.01); *F16L 3/02* (2013.01); *B23K 2101/10* (2018.08);
(Continued)

(58) Field of Classification Search
CPC .. B60K 15/04; B60K 2015/047; B60K 15/01; B60K 15/067; B60K 2015/03486; B60K 2015/0474; B23K 2101/10; F16L 3/02; F16L 3/11; F02M 55/02; F02M 37/0017; F25M 35/10078
(Continued)

(56) References Cited

U.S. PATENT DOCUMENTS

| 1,774,678 A | 9/1930 | Strid |
| 4,361,304 A * | 11/1982 | Younger ................... F16L 3/20 248/58 |

(Continued)

OTHER PUBLICATIONS

International Search Report and Written Opinion, dated Jun. 10, 2019, in connection with PCT/US2019/024283, filed Mar. 27, 2019.
(Continued)

*Primary Examiner* — Christopher Garft
(74) *Attorney, Agent, or Firm* — Lippes Mathias LLP (57) ABSTRACT

A fuel fill tube assembly for an associated vehicle comprises a tubular fill conduit, a receiver attached to the fill conduit, and a bracket mountable to a surface of the associated vehicle, the bracket is configured to be received by the receiver to thereby support the fill conduit relative to the associated vehicle.

12 Claims, 8 Drawing Sheets

(51) Int. Cl.
*F16L 3/02* (2006.01)
*B23K 101/10* (2006.01)
*B60K 15/03* (2006.01)
*B60K 15/067* (2006.01)

(52) U.S. Cl.
CPC ............ *B60K 2015/03486* (2013.01); *B60K 2015/047* (2013.01); *B60K 2015/0474* (2013.01); *B60K 15/067* (2013.01)

(58) Field of Classification Search
USPC .......... 248/223.41, 224.51–224.61, 47–74.5
See application file for complete search history.

(56) References Cited

U.S. PATENT DOCUMENTS

| | | | | |
|---|---|---|---|---|
| 4,518,138 | A | | 5/1985 | Stutenkemper |
| 5,725,185 | A | * | 3/1998 | Auclair .................. H02G 3/32 |
| | | | | 248/74.1 |
| 5,890,685 | A | * | 4/1999 | Takahashi ............... F16L 3/133 |
| | | | | 248/74.1 |
| 6,672,029 | B2 | * | 1/2004 | Tucker ................ B28B 23/0056 |
| | | | | 249/91 |
| 7,367,101 | B2 | | 5/2008 | Takahashi et al. |
| 7,516,540 | B2 | * | 4/2009 | Ueda ........................ H01F 17/06 |
| | | | | 29/745 |
| 2004/0256522 | A1 | * | 12/2004 | Takahashi ............... B60K 15/04 |
| | | | | 248/68.1 |
| 2012/0192925 | A1 | * | 8/2012 | Grushkowitz .......... H02S 30/10 |
| | | | | 136/251 |
| 2016/0230261 | A1 | * | 8/2016 | Urashima ............... C22C 38/60 |
| 2017/0259665 | A1 | | 9/2017 | Zhangsheng et al. |
| 2018/0216587 | A1 | * | 8/2018 | Morimoto ............... F16L 25/10 |

OTHER PUBLICATIONS

International Preliminary Report on Patentability, dated Feb. 25, 2020, in connection with PCT/US2019/024283, filed Mar. 27, 2019.

* cited by examiner

TWO-PIECE FUEL FILLER TUBE ASSEMBLY BRACKET

CROSS REFERENCE TO RELATED PATENTS AND APPLICATIONS

This application claims priority to and the benefit of the filing date of International Application No. PCT/US2019/024283, filed Mar. 27, 2019, which application claims priority to and the benefit of the filing date of U.S. Provisional Patent Application Ser. No. 62/649,087, filed Mar. 28, 2018, which applications are hereby incorporated by reference.

BACKGROUND

The present disclosure relates to fuel filler tubes and related assemblies for filling a vehicle with fuel. It finds particular use in connection with a fuel filler tube assembly having a mounting bracket for supporting a neck of the fuel filler tube assembly, and will be described in connection therewith.

Fuel filler tube assemblies have been around at least since the dawn of gasoline-powered vehicles. In general, a fuel filler tube assembly is a conduit for routing fuel from a filler neck to a fuel tank. The filler neck is generally positioned in a convenient location so that it can be readily accessed during refueling operations. The filler neck is fluidly coupled to the fuel tank via a hose or other conduit. A cap or cover is often provided for closing off the filler neck between refueling operations.

Past fuel filler tube assemblies often employ a mounting flange surrounding the filler neck for mounting and securing the assembly to a body panel or other component of a vehicle. The mounting flange is typically telescoped over the filler neck and secured in place via various welding methods. Then a filler neck insert is installed in the fuel filler neck, and the rim of the opening of the filler neck is rolled down to join/secure the insert with the filler neck.

Fuel filler tube assemblies are subject to certain industry standard requirements. One particular requirement is that the fuel filler neck mount must resist a minimum level of force before breaking or otherwise coming unfastened. Another particular requirement is that the failure mode of the fuel filler neck mount should not compromise the fuel filler neck or other components of the fuel filler tube assembly to avoid fuel leakage in the event of an accident, for example. To this end, the mounting flange of the prior art assembly is typically provided with one or more designed fracture points. The fracture points are designed to yield above a minimum level of force, while failing in a manner that preserves the integrity of the fuel filler neck.

The prior art fuel filler tube assembly requires certain manufacturing steps, such as rolling the filler neck rim after installation of the mounting flange and designed fracture points, that complicate the manufacturing process and increase costs.

BRIEF DESCRIPTION

Design criteria for fuel filler tube assemblies are driven by packaging constraints, but also by regulations and specifications as set by the regulating bodies for emissions and safety, as well as requirements of the individual original equipment manufacturer, who sets the product specifications. Besides the various expectations for filler pipes on how to fulfill emissions and crash safety, one particular specification stands out for filler holding bracket designs: the bracket pull off criteria which has to be met in/after a vehicle crash. In simple terms, no parent metal in the filler tube shall be pulled in a bracket pull test or crash test. This standard is intended to ensure the filler tube remains intact after separation of the bracket therefrom.

The present disclosure sets forth an exemplary fuel filler tube assembly having a two-piece bracket configured for streamlined installation, which does not require the manufacturing steps of rolling the filler neck rim after installation of a mounting flange and designed fracture points. The exemplary assembly includes a receiver component brazed or otherwise attached to a filler neck. A bracket component is configured to be mechanically (or otherwise) coupled to the receiver component via a coupling mechanism. The coupling mechanism facilitates simple coupling of the bracket component to the receiver through a friction fit, snap fit, interference fit or other type of connection. The receiver component is configured to resist a minimum force applied to the assembly prior to cleanly separating from the fuel filler neck leaving the same in an undamaged state.

Aspects of the present disclosure reduce manufacturing complexity, provide improved bracket pull test results (e.g., easier rip off weaker receiver avoiding designed fracture point), reduced tooling cost, reduced piece price at scale and higher flexibility in design as the bracket can be adapted for a wide range of applications.

In accordance with one aspect, a fuel fill tube assembly for an associated vehicle comprises a tubular fill conduit, a receiver attached to the fill conduit, and a bracket mountable to a surface of the associated vehicle, the bracket is configured to be received by the receiver to thereby support the fill conduit relative to the associated vehicle.

The receiver can include first and second mounting flanges and a center portion extending between the first and second mounting flanges, at least a portion of the center portion and the fill conduit defining a slot, and the bracket can include a coupling flange configured to be received in the slot. The center portion can include at least one recess or protrusion and the mounting flange can include at least one protrusion or recess adapted to cooperate with the at least one recess or protrusion of the center portion to restrict withdrawal of the mounting flange from the slot. The bracket can be brazed to the fill conduit along at least one of the mounting flanges. The slot can be arcuate, and the mounting flange can have a profile corresponding to the slot. The slot can open along a longitudinal direction of the fill conduit, whereby the bracket can be translated relative to the receiver along the longitudinal direction of the conduit to insert the mounting flange into the slot. The center portion can include at least one recess and the mounting flange can include at least one protrusion adapted to cooperate with the at least one recess of the center portion to restrict withdrawal of the mounting flange from the slot. The mounting flange can further include at least one shaped portion adjacent the recess, the shaped portion adapted to guide the at least one protrusion towards the recess during assembly. The shaped portion can be tapered from a first width to a second width, the first width being greater than the second width and further from the recess.

In accordance with another aspect, a bracket assembly for an associated fuel fill tube assembly comprises a receiver attachable to a fill conduit of the associated fuel fill tube assembly, and a bracket mountable to a surface of an associated vehicle, the bracket configured to be received by the receiver to thereby support the fill conduit of the associated fuel fill tube assembly relative to the associated vehicle.

The receiver can include first and second mounting flanges and a center portion extending between the first and second mounting flanges, at least a portion of the center portion and the fill conduit of the associated fuel fill tube assembly defining a slot, and the bracket can include a coupling flange configured to be received in the slot. The center portion can include at least one recess or protrusion and the mounting flange can include at least one protrusion or recess adapted to cooperate with the at least one recess or protrusion of the center portion to restrict withdrawal of the mounting flange from the slot. The center portion can include at least one recess and the mounting flange can include at least one protrusion adapted to cooperate with the at least one recess of the center portion to restrict withdrawal of the mounting flange from the slot, The mounting flange can further include at least one shaped portion adjacent the recess, the shaped portion adapted to guide the at least one protrusion towards the recess during assembly. The shaped portion can be tapered from a first width to a second width, the first width being greater than the second width and further from the recess.

In accordance with another aspect, a method of mounting a fuel fill tube assembly to a vehicle comprises securing a receiver to a tubular fuel fill conduit, at least a portion of the receiver forming a slot with the fuel fill conduit, inserting a mounting flange of a bracket into the slot formed by the receiver and the fuel fill conduit, and mounting the bracket to a component of the vehicle. The bracket is coupled to the receiver by an interference fit.

The method can further include one or more of brazing the receiver to the fuel fill conduit and/or aligning a protrusion of the mounting flange in recess of the receiver, with the protrusion and recess cooperating to restrict withdrawal of the mounting flange from the slot. The bracket can be translated along a longitudinal axis of the fuel fill conduit to align the protrusion with the recess. The bracket can be mounted to the component of the vehicle prior to inserting the mounting flange into the slot.

DETAILED DESCRIPTION

Figure 1:
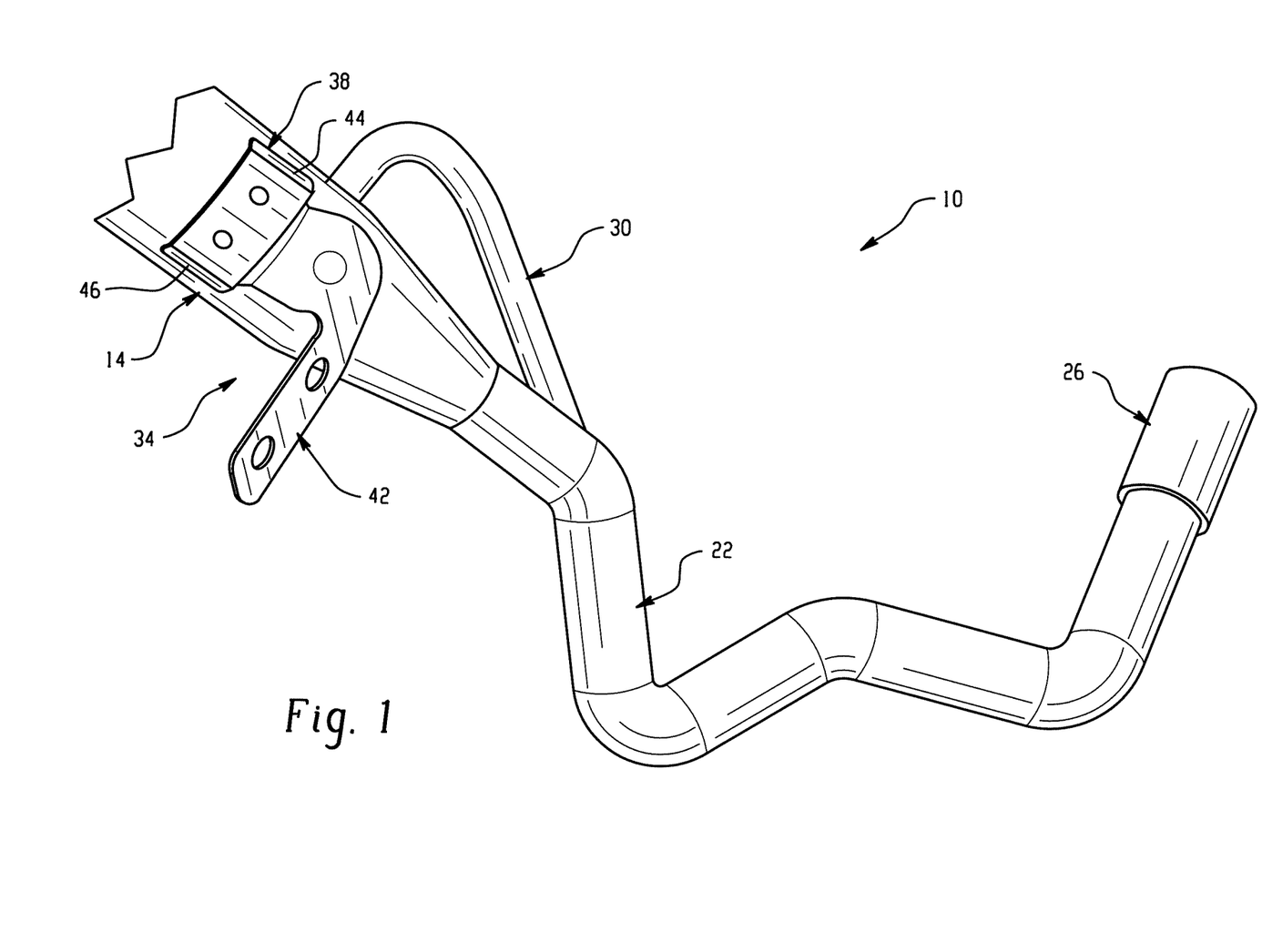
FIG. 1 is a perspective view of an exemplary fuel filler tube assembly in accordance with the present disclosure.

In FIGS. 1-4, an exemplary fuel filler tube assembly in accordance with a first embodiment of the present disclosure is illustrated and identified generally by reference numeral 10. As seen in FIG. 1, the fuel filler tube assembly 10 generally includes a fuel filler neck 14 (e.g., a tubular fuel fill conduit) having a mouth 18 for receiving a fuel dispensing nozzle (not shown) in conventional fashion. The fuel filler neck 14 is coupled to a tube 22 which in turn is coupled to a fuel tank fitting 26. The fuel tank fitting 26 is configured to be coupled to an associated fuel tank (not shown) for delivering fuel dispensed by a dispensing nozzle into the fuel filler neck 14 to the fuel tank. The fuel filler tube assembly 10 further includes a vent line or recirculation line 30, depending on the application (e.g., diesel or gas) for venting or recirculating vapors from the associated fuel tank.

Figure 2:
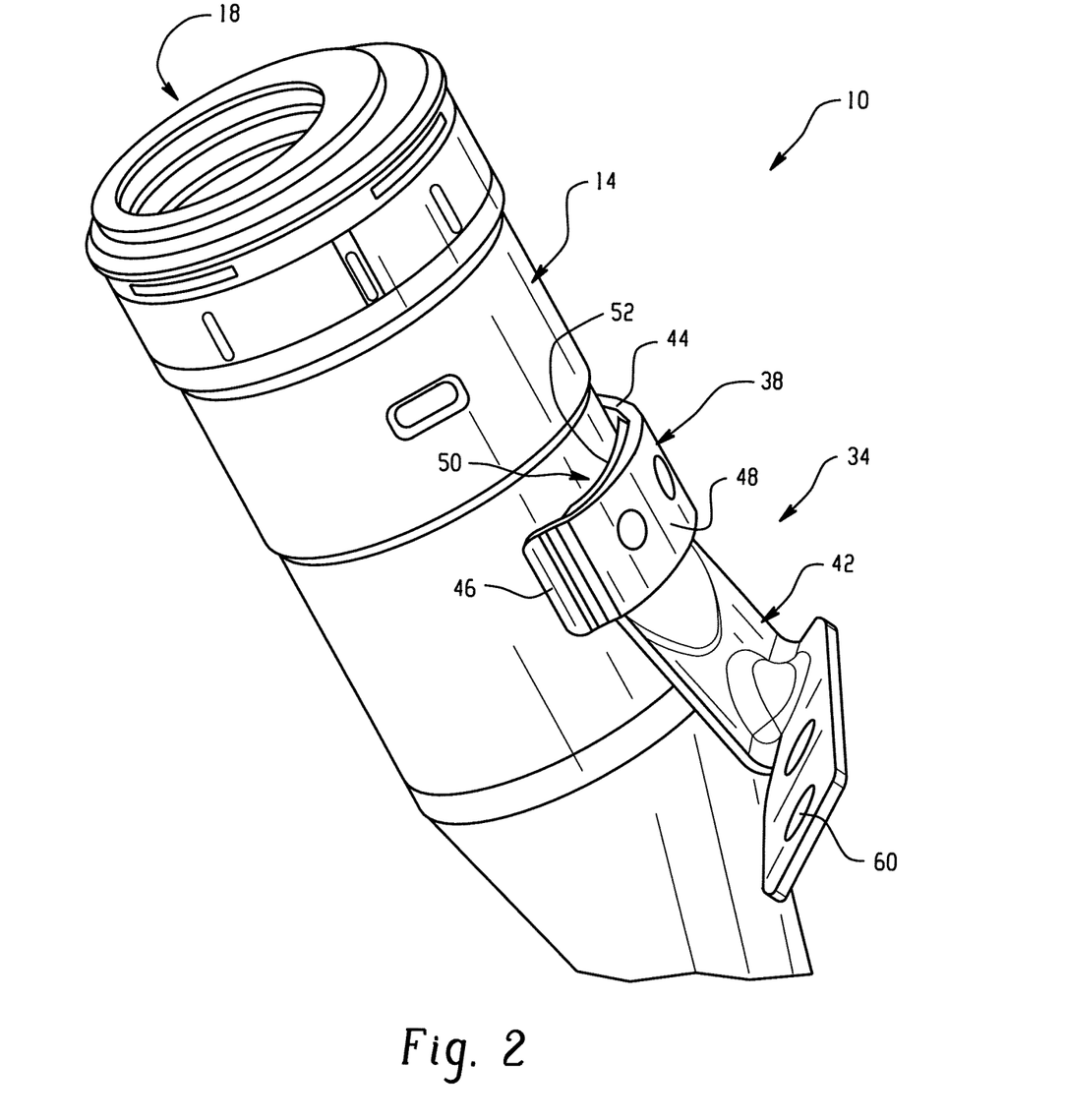
FIG. 2 is a perspective view of an exemplary two-piece bracket assembly in accordance with the present disclosure.
Figure 3:
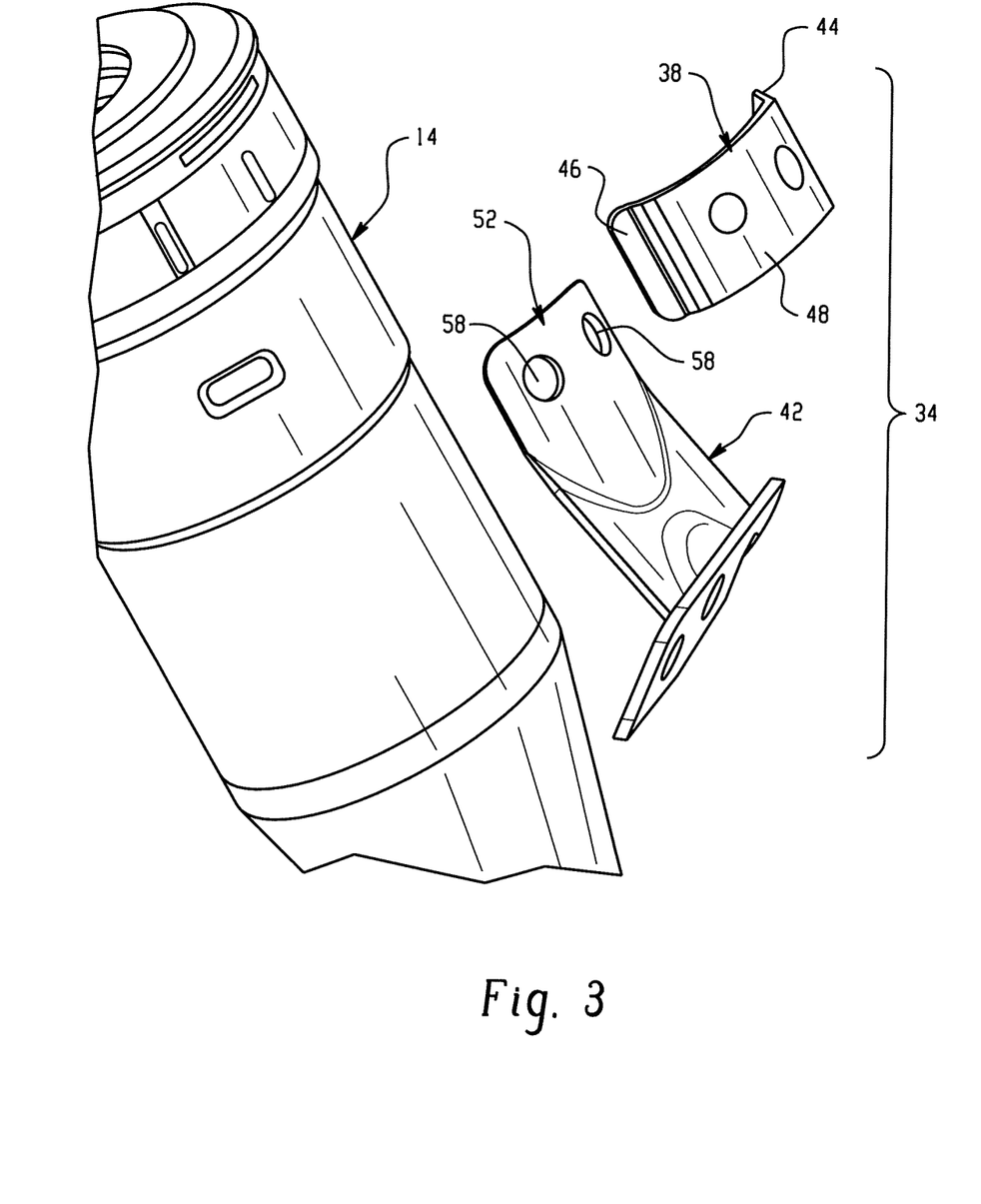
FIG. 3 is a first perspective exploded view of the two-piece bracket assembly of FIG. 2.

With additional reference to FIG. 2, and in accordance with the present disclosure, a two-piece bracket assembly 34 is provided for supporting the fuel filler neck 14. The two-piece bracket assembly 34 generally includes a receiver component 38 brazed onto (or otherwise secured) an outer surface of the fuel filler neck 14 and a bracket component 42 coupled with the receiver component 38.

The receiver component 38 generally comprises a metal strip having first and second mounting flanges 44/46. The mounting flanges 44/46 have a curved bottom surface for closely mating against the curved outside diameter of the fuel filler neck 14. The curved surfaces of the flanges 44/46 are configured to be brazed onto the fuel filler neck 14, but other types of connection methods can be employed. Between the mounting flanges 44/46 is a center portion 48 that is spaced apart from the fuel filler neck 14 to form a slot 50 between the fuel filler neck 14 and the receiver component 38.

Figure 4:
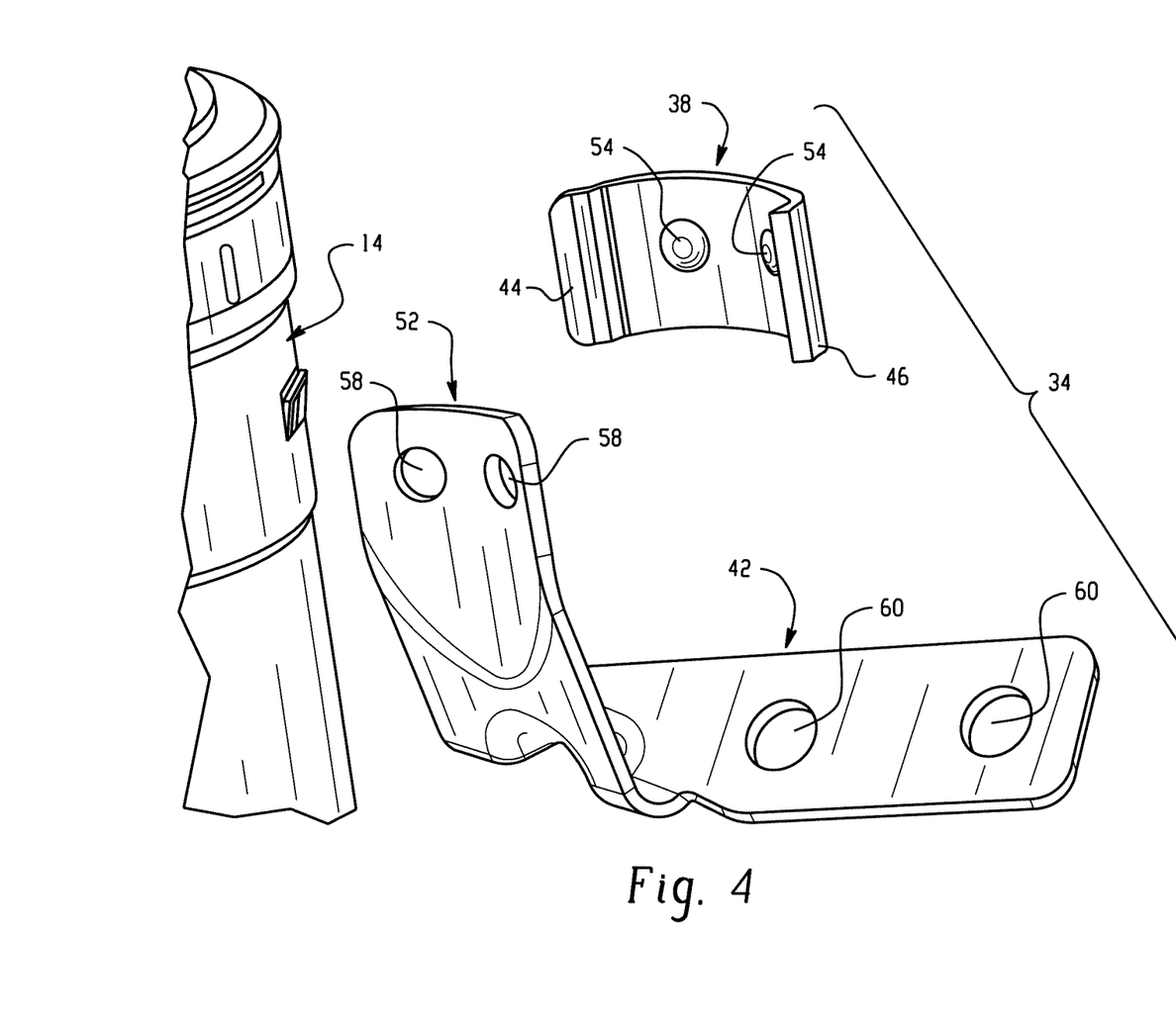
FIG. 4 is a second perspective exploded view of the two-piece bracket assembly of FIG. 2.

Slot 50 is adapted to receive a coupling flange 52 of the bracket component 42. It should be appreciated that the dimensions of the slot 50 and/or coupling flange 52 can be sized to provide an interference fit therebetween to reduce or eliminate rattling between the components. In the illustrated embodiment, and as best shown in FIG. 4, the receiver component 38 includes a pair of protrusions 54 (e.g., dimples) that extend towards the outer surface of the fuel filler neck 14 from the center portion 48. The protrusions 54 are configured to be received in corresponding openings 58 in the coupling flange 52 of the bracket component 42 when the same is coupled with the receiver component 38.

As will be appreciated, the receiver component 38 and/or the bracket component 42 (e.g., the protrusions 54) can have sufficient resiliency to allow the coupling flange to slide into slot 52 until the protrusions 54 are positioned in openings 58, thereby restricting withdrawal of the coupling flange 52 from the receiver component 38. Other types of coupling arrangements are also contemplated by the present disclosure.

The bracket component 42 can be mounted to any suitable surface of a vehicle, such as a body panel or frame component via mounting holes 60. It should be understood that the bracket component 42 can be mounted to a corresponding component of a vehicle before or after coupling with the receiver components 38. In some installations, the bracket component 42 can be partially or fully secured to the vehicle, and then coupled with the receiver component 38. To this end, the bracket component 42 could be formed and installed to the vehicle in a separate process, and then the fuel filler tube assembly 10 can be coupled to the preinstalled bracket component 42 in a tool-less process by insertion of the coupling flange 52 into the slot 50 to engage the protrusions 54 with the openings 58. This allows flexibility of installation of the fuel filler tube assembly 10 during a vehicle manufacturing process. The orientation of the slot 50 is such that it opens along a longitudinal axis of the fuel filler neck 14. As such, coupling of the bracket component 42 and receiver 38 is effected by translating one or both components along such longitudinal axis to thereby insert the coupling flange 52 into the slot 52.

Turning to FIGS. 5-8, another exemplary fuel filler tube assembly in accordance with a second embodiment of the present disclosure is illustrated and identified generally by reference numeral 10'. The fuel filler tube assembly 10' is similar in many respects to the fuel filler tube assembly 10 with similar components being denoted with primed numbers.

Figure 5:
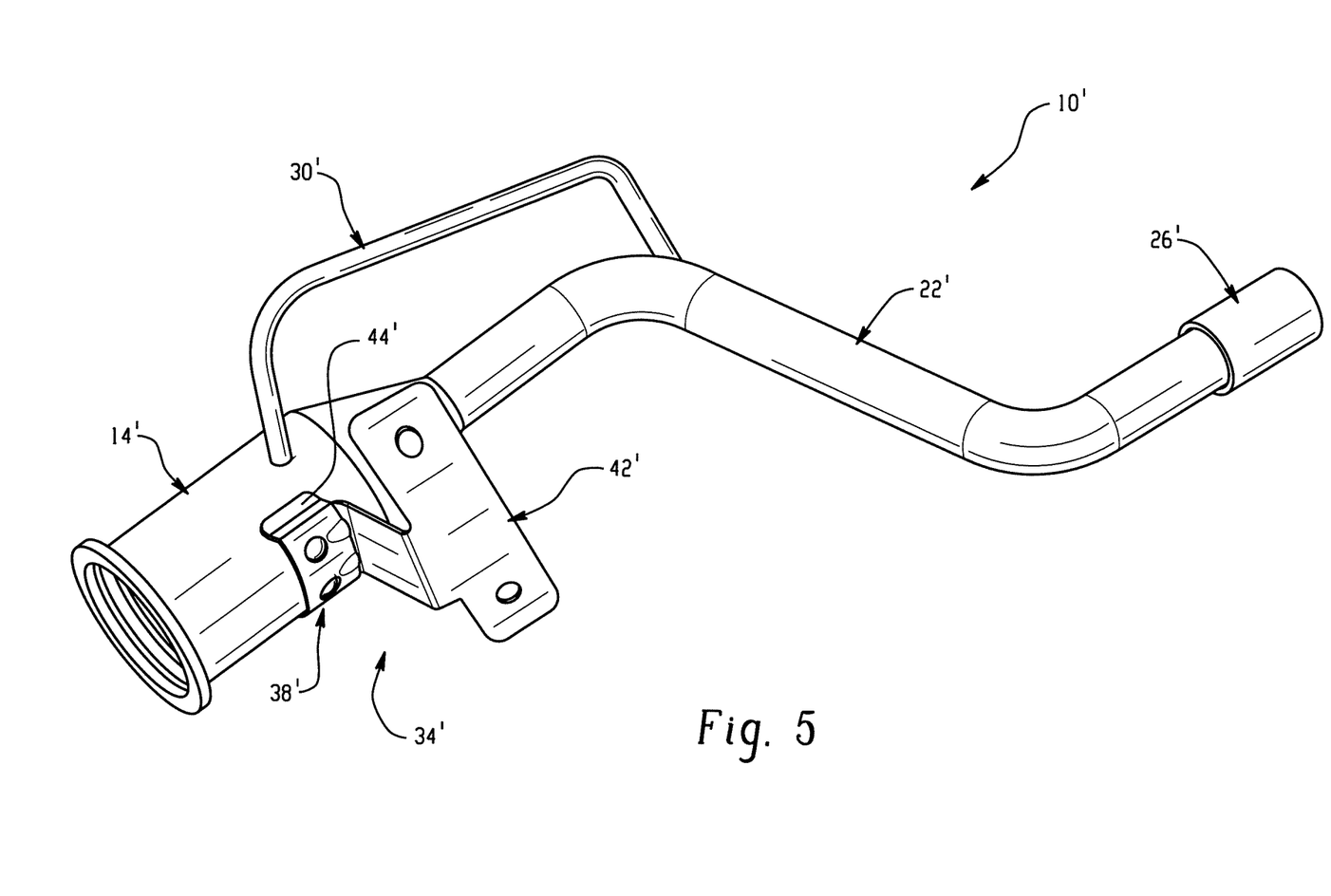
FIG. 5 a perspective view of another exemplary fuel filler tube assembly in accordance with the present disclosure.
Figure 6:
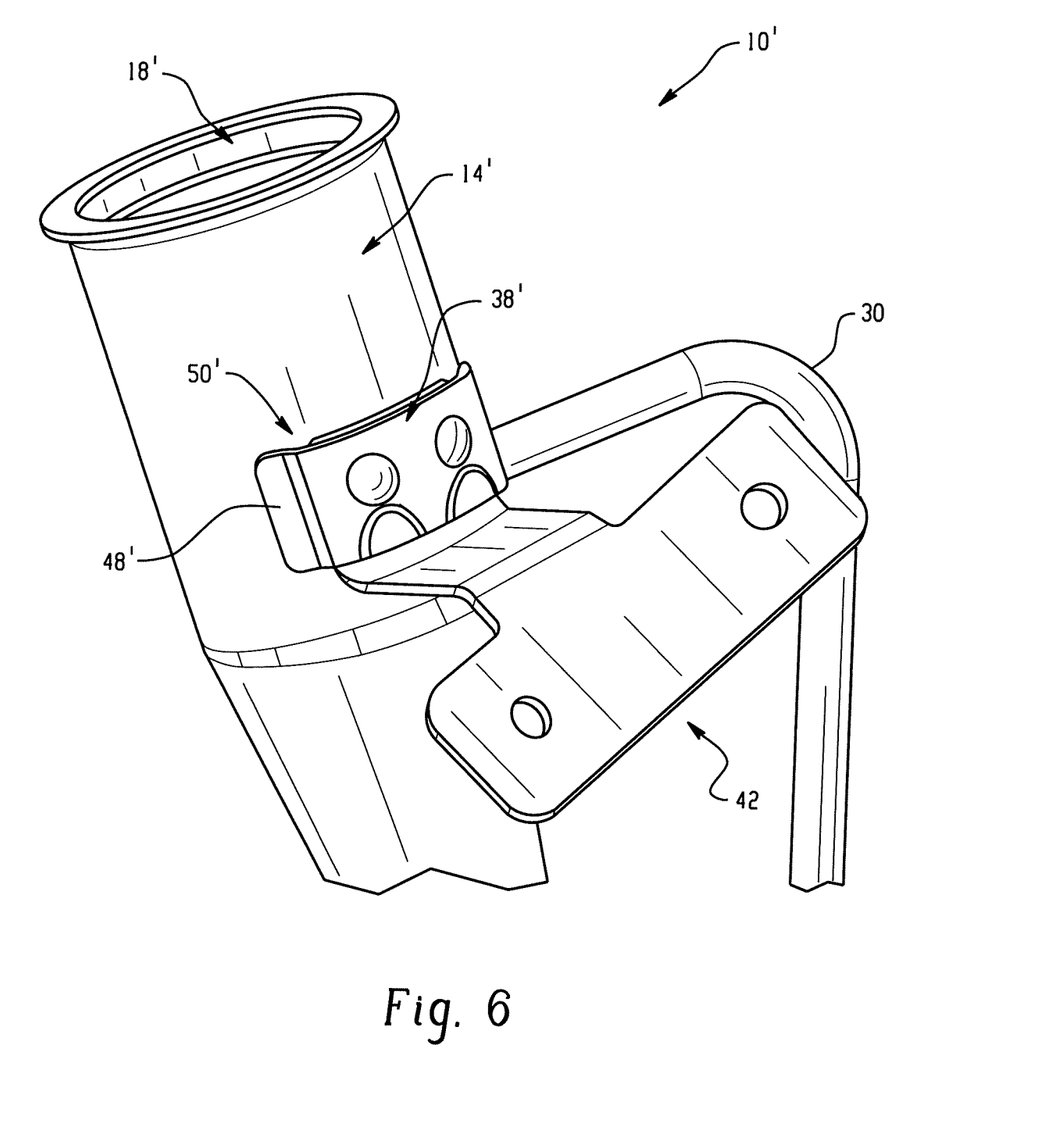
FIG. 6 is a perspective view of another exemplary two-piece bracket assembly in accordance with the present disclosure.
Figure 7:
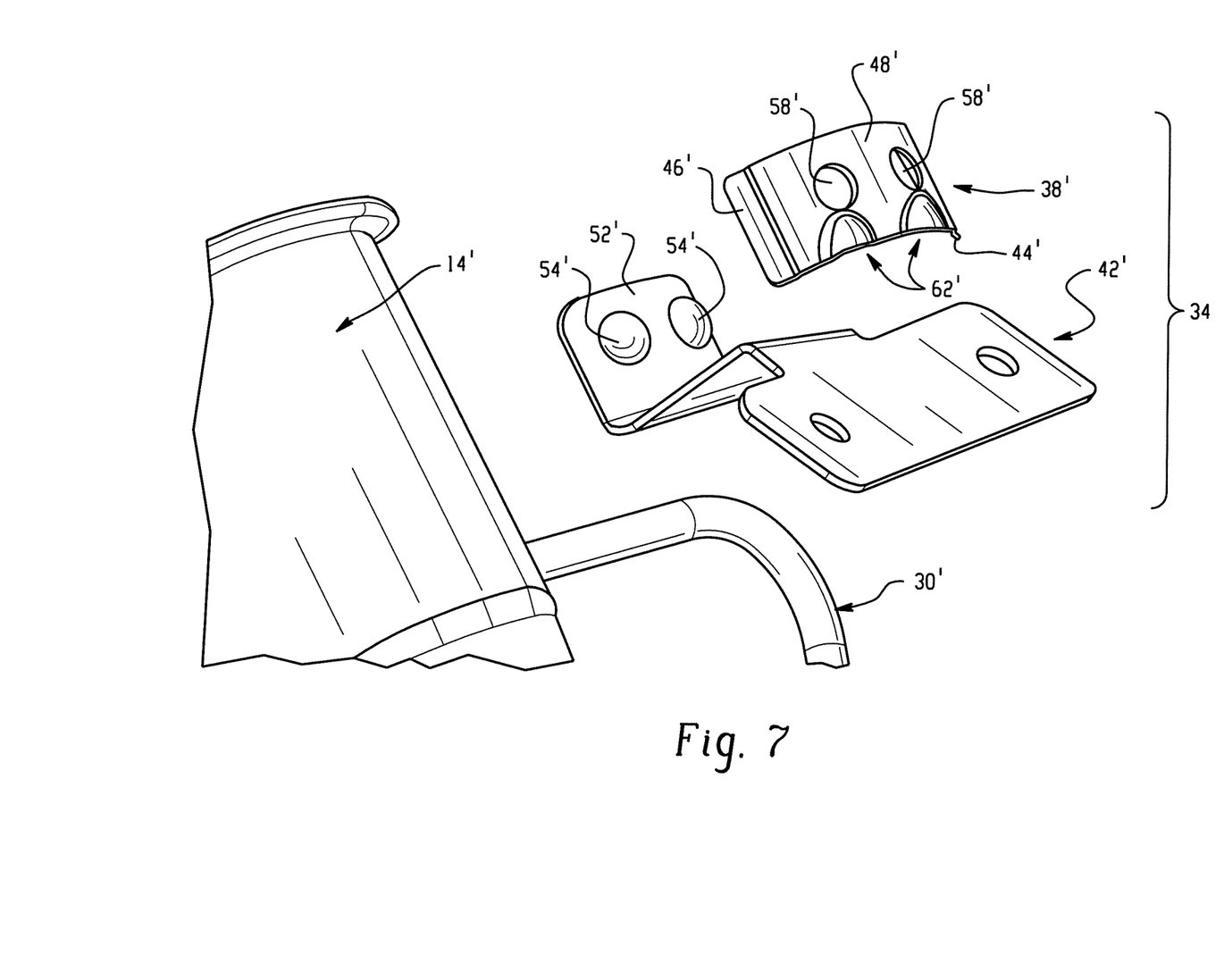
FIG. 7 is a first perspective exploded view of the two-piece bracket assembly of FIG. 6.
Figure 8:
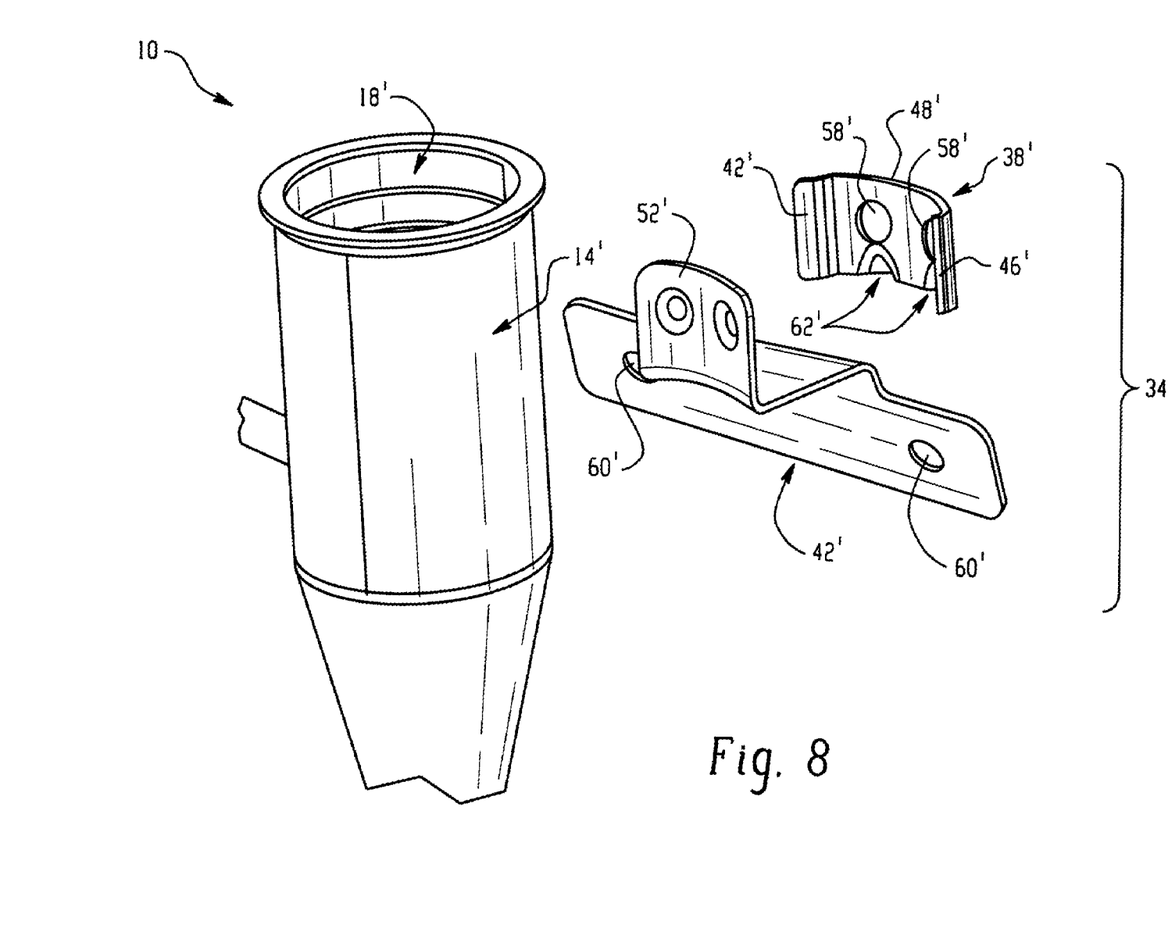
FIG. 8 is a second perspective exploded view of the two-piece bracket assembly of FIG. 6.

Accordingly, and with initial reference to FIG. 5, the fuel filler tube assembly 10' generally includes a fuel filler neck 14' (e.g., tubular fuel fill conduit) having a mouth 18' for receiving a fuel dispensing nozzle (not shown) in conventional fashion. The fuel filler neck 14' is coupled to a tube 22' which in turn is coupled to a fuel tank fitting 26'. The fuel tank fitting 26' is configured to be coupled to an associated fuel tank (not shown) for delivering fuel dispensed by a dispensing nozzle into the fuel filler neck 14' to the fuel tank. The fuel filler tube assembly 10' further includes a vent line 30' for venting the associated fuel tank.

In accordance with the present disclosure, a two-piece bracket assembly 34' is provided for supporting the fuel filler neck 14'. The two-piece bracket assembly 34' generally includes a receiver component 38' brazed onto the fuel filler neck 14' and a bracket component 42' coupled with the receiver component 38'. The receiver component 38' generally comprises a metal strip having first and second mounting flanges 44'/46'. The mounting flanges 44'/46' have a curved bottom surface for closely mating against the curved outside diameter of the fuel filler neck 14'. The curved surfaces of the flanges 44'/46' are configured to be brazed onto the fuel filler neck 14', but other types of connection methods can be employed. Between the mounting flanges 44'/46' is a center portion 48' that is spaced apart from the fuel filler neck 14 to form a slot 50' between the fuel filler neck 14' and the receiver component 38'.

Slot 50' is adapted to receive a coupling flange 52' of the bracket component 42'. It should be appreciated that the dimensions of the slot 50' and/or coupling flange 52' can be sized to provide an interference fit therebetween to reduce or eliminate rattling between the components. In the embodiment of FIGS. 5-8, and in contrast to the embodiment of FIGS. 1-4, the coupling flange 52' has a pair of protrusions 54' (e.g., dimples) configured to be received in corresponding openings 58' in the coupling flange 52' of the bracket component 42' when the same is coupled with the receiver component 38'.

In addition, the receiver component has shaped portions 62' adjacent the openings 58' that receive the protrusions 54' as the coupling flange 52' is urged into place in the slot 50'. The shaped portions 62' initially receive the protrusions 54' helping to align and guide the protrusions 54' to the openings 58' as the coupling flange 52' is inserted into the slot 50'. The shaped portions 62' can also reduce the effort required to "snap" the coupling flange 52' into place by providing a ramped surface upon which the protrusions 54' increasingly impinge until snapping into the openings 58'. To this end, the shaped regions 62' provide a small amount of additional clearance for the protrusions 54' between the center portion 48' and the fuel filler neck 14'. The shaped regions 62' may be tapered such that they have a wider dimension near an edge of the center portion 48' and a more narrow dimension near or adjacent to the openings 54'. The tapered shape aids in guiding the protrusions 54' into the corresponding openings 58', and provides a ramped surface against which the protrusions 54' impinge as the bracket component 42' is seated in the receiver component 38'.

The two-piece bracket assemblies 34 and 34' in accordance with the present disclosure provide mounting solutions that meet or exceed industry requirements for breakaway performance. For example, testing has shown that the receiver component can withstand over 3000 N of force before separating from the fuel filler neck. In general, one or both braze joints (e.g., between the mounting flanges 44/46 and the fuel filler neck 14) fails when sufficient force is applied, with the receiver component separating cleanly from the fuel filler neck with no damage (e.g., no parent metal fractures) to the filler neck. In the test, the pull off force well exceeded the industry requirements.

It should also be appreciated that the two-piece configuration of the present disclosure allows the bracket component to be easily exchanged/modified as market demands dictate. That is, simply changing out the bracket component with another bracket component of a different shape/size allows a fuel fill tube assembly to be mounted in a variety of locations and/or vehicles.

Aspects of the present disclosure are directed to reducing or eliminated crevice corrosion that has been a problem in some prior art approaches. By brazing the mounting flanges to the outside diameter of the fuel filler neck such that the entire surface of each flange is joined eliminates crevice volume that may exist in some prior art designs. In addition, coating the fuel fill tube assemblies of the present disclosure with paint or other anti-corrosion coatings can be performed more effectively since the receiver is a relatively small component as compared to the overall bracket assembly. That is, prior art solutions such as single piece welded or brazed brackets often have crevices and or other surfaces that are difficult to coat and are susceptible to corrosion whereas the bracket assembly in accordance with the present disclosure eliminates crevices and/or difficult to coat surfaces.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A fuel fill tube assembly for an associated vehicle comprising:
 a tubular fill conduit;
 a receiver attached to the fill conduit;
 a bracket mountable to a surface of the associated vehicle, the bracket configured to be received by the receiver to thereby support the fill conduit relative to the associated vehicle;
 wherein the receiver includes first and second mounting flanges and a center portion extending between the first and second mounting flanges, at least a portion of the center portion and the fill conduit defining a slot, and wherein the bracket includes a coupling flange configured to be received in the slot; and
 wherein the slot opens along a longitudinal direction of the fill conduit, whereby the bracket can be translated relative to the receiver along the longitudinal direction of the conduit to insert the coupling flange into the slot; and wherein the bracket is coupled to the receiver by an interference fit.

2. The fuel fill tube assembly of claim 1, wherein the center portion includes at least one protrusion and wherein the coupling flange includes at least one opening or recess adapted to cooperate with the at least one protrusion of the center portion to restrict withdrawal of the coupling flange from the slot.

3. The fuel fill tube assembly of claim 2, wherein the bracket is brazed to the fill conduit along at least one of the mounting flanges.

4. The fuel fill tube assembly of claim 1, wherein the slot is arcuate, and wherein the coupling flange has a profile corresponding to the slot.

5. The fuel fill tube assembly of claim 1, wherein the center portion includes at least one opening or recess and wherein the coupling flange includes at least one protrusion adapted to cooperate with the at least one opening or recess of the center portion to restrict withdrawal of the coupling flange from the slot, and wherein the center portion further includes at least one shaped portion adjacent the opening or recess, the shaped portion adapted to guide the at least one protrusion towards the opening or recess during assembly.

6. The fuel fill tube assembly of claim 5, wherein the shaped portion is tapered from a first width to a second width, the first width being greater than the second width and further from the opening or recess.

7. A method of mounting a fuel fill tube assembly to a vehicle comprising:
   securing a receiver to a tubular fuel fill conduit, at least a portion of the receiver forming a slot with the fuel fill conduit, wherein the slot opens along a longitudinal direction of the fuel fill conduit;
   inserting a coupling flange of a bracket into the slot formed by the receiver and the fuel fill conduit; and
   mounting the bracket to a component of the vehicle;
   wherein the bracket is coupled to the receiver by an interference fit.

8. The method of claim 7, further comprising brazing the receiver to the fuel fill conduit.

9. The method of claim 7, further comprising aligning a protrusion of the coupling flange in an opening or recess of the receiver, said protrusion and said opening or recess cooperating to restrict withdrawal of the coupling flange from the slot.

10. The method of claim 9, wherein the bracket is translated along the longitudinal axis of the fuel fill conduit to align the protrusion with the opening or recess.

11. The method of claim 7, wherein the bracket is mounted to the component of the vehicle prior to inserting the coupling flange into the slot.

12. A fuel fill tube assembly for an associated vehicle comprising:
   a tubular fill conduit;
   a receiver having first and second mounting flanges brazed to the tubular fill conduit and a center portion extending between the first and second mounting flanges in spaced relation to the tubular fill conduit defining an arcuate slot; and
   a bracket mountable to a surface of the associated vehicle, the bracket having a curved coupling flange configured to be received in the arcuate slot to thereby support the fill conduit relative to the associated vehicle;
   wherein the center portion of the receiver includes at least one opening or recess and wherein the coupling flange includes at least one protrusion adapted to cooperate with the at least one opening or recess of the center portion to restrict withdrawal of the coupling flange from the slot, the mounting flange further including at least one shaped portion adjacent the opening or recess, the shaped portion adapted to guide the at least one protrusion towards the opening or recess during assembly, the shaped portion being tapered from a first width to a second width, the first width being greater than the second width and further from the opening or recess; and
   wherein the slot opens along a longitudinal direction of the fill conduit;
   whereby the bracket can be translated relative to the receiver along the longitudinal direction of the conduit to insert the mounting flange into the slot; and wherein the bracket is coupled to the receiver by an interference fit.

* * * * *